Patented Apr. 27, 1954

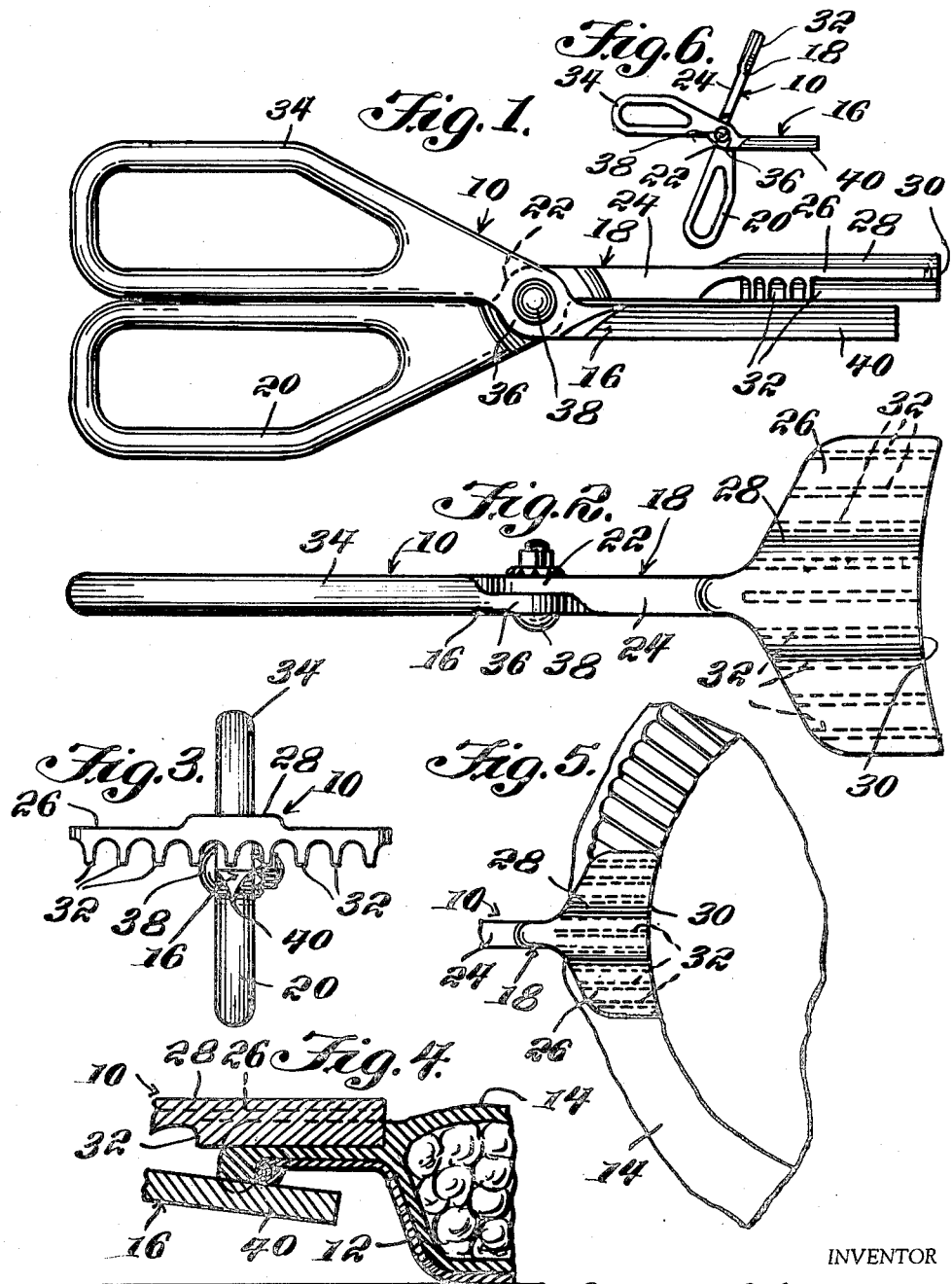

2,676,551

UNITED STATES PATENT OFFICE 2,676,551

PIE TRIMMER AND CRIMPER

Arthur A. Jacobson, Sheridan, Wyo.

Application May 26, 1953, Serial No. 357,535

3 Claims. (Cl. 107—49)

This invention relates to a device for crimping and trimming pies. More particularly, the invention has reference to a crimping and trimming device which is of the shears type, the device being so formed as to permit the same to be initially applied to the periphery of a pie in such a manner as to crimp said periphery, the device further being so formed as to allow it to be subsequently applied to the pie periphery in such a way as to trim the excess dough therefrom.

The main object of the present invention is to provide a pie crimping and trimming device of the shears type which will be of a generally improved design, so as to permit a pie to be fluted or crimped, and subsequently trimmed, with minimum difficulty and in minimum time.

Still another object is to provide a device as stated wherein the crimping means will be so designed as to permit excess dough to be given an escape, instead of being forced back onto the top of the pie.

Another object of importance is to provide a device as stated which can be shifted inwardly of the periphery of the pie to a selected extent, thereby to form the flutes to selected widths. This arrangement is desirable in that it allows pies to be crimped or fluted in any of various ways. For example, in some instances one may desire to extend the flutes fully from the edge of the pie to the beginning of the dished portion thereof. In other instances, one may desire to form the flutes to a smaller size, thereby to define a continuous, upstanding portion bounding the dished portion of the pie and extended along the inner edge of the fluted area.

Another object is to provide a device as stated in which the pie can be trimmed of excess dough with little difficulty, after the fluting step has been completed. Heretofore, it has been proposed to provide a shears-type crimper and trimmer which trims the excess dough from the pie simultaneously with the crimping thereof, but it has been found that this proposed construction automatically involves that the fluted area be, in every instance of a predetermined width. It has been further found that the construction heretofore proposed will, in many instances, force the dough inwardly of the pie, both of these characteristics being undesirable in a device of this type.

Other objects will appear from the following description, the claims appended thereto, and from the annexed drawing, in which like reference characters designate like parts throughout the several views, and wherein:

Figure 1 is a side elevational view of a crimping and trimming device formed in accordance with the present invention;

Figure 2 is a top plan view;

Figure 3 is an end elevational view, wherein the device is viewed from the right in Figure 1;

Figure 4 is an enlarged, fragmentary longitudinal sectional view showing the device applied to a pie to be trimmed;

Figure 5 is a fragmentary top plan view showing the device in use; and

Figure 6 is a reduced side elevational view showing the device with the parts positioned ready for trimming of the pie.

The pie crimping and trimming device has been designated generally by the reference numeral 10. A pie to be trimmed has also been shown in the drawing, said pie being contained in a pie tin or pan 12, and being designated generally by the reference numeral 14.

The invention includes pivotally connected members 16, 18 respectively each of which will be described in turn.

Member 18 includes a grip 20, which is of conventional, looped design, said grip being adapted to receive the fingers of one hand. At its inner end, the grip 20 is of tapered formation, and merges into an upwardly offset mid-length portion 22. Portion 22, as shown in Figure 2, is reduced in thickness relative to the arm portion 24 of said member 18. The arm 24 is of straight formation, and is integral, at its outer end, with a crimping plate 26. Crimping plate 26 is of flat formation, and may be reinforced medially between the opposite side edges thereof by being formed with a thickened part 28.

The outer edge of the plate 26 is curved from side to side of the plate, as at 30, the curvature of the plate corresponding to the curvature of the periphery of the pie 14.

Formed upon the underside of the plate, over the full area of the plate, are depending ribs or flutes 32. These are extended in parallel relation, and are of straight formation, each rib extending fully from the outer edge 30 to the opposing, inner edge of the plate 26, as best shown in Figure 2. By reason of this arrangement, parallel spaces are defined between the several ribs, said spaces being fully open at their opposite ends, upon the outer and inner edges of the plate 26, respectively. This construction allows an escape for the dough of the pie 14, when the pie is crimped in the manner shown in Figure 4.

It is also important to note that the plate 26 is so designed as to cause its greatest dimension to be disposed transversely of the longitudinal center line of the member 18. The advantage of this formation will be described in detail hereinafter.

The member 16, at one end, is formed with a looped grip 34 complementing the grip 20, so as to receive the thumb of the user's hand. Looped grip 34 is of tapered formation at its inner end, merging into a downwardly offset portion 36 of half thickness, extending in contact with the portion 22 of member 18. A pivot pin 38 extends between the portions 22, 36, through registering openings formed in said portions, thus to pivotally connect the members 16, 18 for relative swinging movement between positions shown in Figures 1 and 6, respectively.

The downwardly offset portion 36 of member 16 merges into an elongated, straight blade 40 aligned longitudinally with arm 24, and underlying said arm. Blade 40 is preferably of triangular cross section as shown in Figure 3, and has a flat top surface faced upwardly, to oppose the downwardly facing, depending ribs 32 of member 18. This causes the cutting edge of the blade 40 to be faced downwardly, for a purpose to be made presently apparent.

The blade 40, as shown in Figures 1 and 4, is extended into closely spaced relation to the edge 30, but terminates short of said edge.

In use of the device, and assuming the pie is to be first crimped or fluted, the device would first be gripped in one hand of the user and the plate 26 and knife or blade 40 moved apart. The plate and blade are then disposed above and below the peripheral flange of the pie tin, as shown in Figure 4, and are forced toward one another. The flat top surface of the blade 40 will engage the underside of the rolled edge of the pie tin, and as a result, the plate 26 can be forced downwardly toward the peripheral flange of the pie tin to any extent desired, thus to crimp or flute the periphery of the pie 14 as deeply as desired. Further, the fluted area can be formed of any desired width, as will be readily apparent. In every instance, excess dough is permitted to escape through the open inner ends of the spaces between adjacent, parallel ribs 32 of plate 26.

After the pie has been fully crimped, the members are spread as in Figure 6.

The blade 40 is then used alone to trim the excess dough from the pie.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A pie crimping and trimming device comprising a pair of elongated members pivotally connected together at substantially the midlength of each, one end of each of said pair of members being formed to provide a grip, the other end of one of said pair of members having its end remote from said grip end formed to provide a crimping plate, said plate having on one face thereof a plurality of ribs; the other of said pair of members being triangular in cross section at its end remote from said grip end and having one side disposed substantially parallel to said plate and meeting therewith when said grip ends are moved together, the edge of said other member opposite said side forming a blade adapted and arranged to coact with the periphery of a pie pan to sever dough overlying the periphery, said pair of members being swingable together to close the face of the plate having the ribs toward the said one side of the other member whereby dough lying on the rim of a pie pan placed therebetween may be pressed against the rim and crimped to have ridges disposed in the plane of the pan rim.

2. A pie crimping and trimming device comprising a pair of elongated members pivotally connected together at substantially the midlength of each, one end of each of said pair of members being formed to provide a grip, the other end of one of said pair of members having its end remote from said grip end formed to provide a crimping plate, said plate having on one face thereof a plurality of parallel ribs extending longitudinally from the outer edge inwardly to the inner edge of said plate; the other of said pair of members being triangular in cross section at its end remote from said grip end and having one side disposed substantially parallel to said plate and meeting therewith when said grip ends are moved together, the edge of said other member opposite said side forming a blade adapted and arranged to coact with the periphery of a pie pan to sever dough overlying the periphery, said pair of members being swingable together to close the face of the plate having the ribs toward the said one side of the other member whereby dough lying on the rim of a pie pan placed therebetween may be pressed against the rim and crimped to have ridges disposed in the plane of the pan rim.

3. A pie crimping and trimming device comprising a pair of elongated members pivotally connected together at substantially the midlength of each, one end of each of said pair of members being formed to provide a grip, the other end of one of said pair of members having its end remote from said grip end formed to provide a crimping plate, said crimping plate having its outer edge concavely curved and being disposed in a plane transverse to the plane of pivotal movement of said pair of members relative to each other, said plate having on one face thereof a plurality of parallel ribs extending longitudinally from the outer edge inwardly to the inner edge of said plate; the other of said pair of members being triangular in cross section at its end remote from said grip end and having one side disposed substantially parallel to said plate and meeting therewith when said grip ends are moved together, the edge of said other member opposite said side forming a blade adapted and arranged to coact with the periphery, said pair of members being swingable together to close the face of the plate having the ribs toward the said one side of the other member whereby dough lying on the rim of a pie pan placed therebetween may be pressed against the rim and crimped to have ridges radially disposed to and in the plane of the pan rim.

References Cited in the file of this patent

UNITED STATES PATENTS

| Number | Name | Date |
| --- | --- | --- |
| 1,356,692 | Burton | Oct. 26, 1920 |
| 1,400,383 | Stagge | Dec. 13, 1921 |
| 2,577,032 | Paschis | Dec. 4, 1951 |
| 2,611,328 | Roman | Sept. 23, 1952 |